US011991781B2

(12) United States Patent
Sun et al.

(10) Patent No.: US 11,991,781 B2
(45) Date of Patent: May 21, 2024

(54) SUBSCRIBER DATA MANAGEMENT METHOD AND APPARATUS

(71) Applicant: Huawei Technologies Co., Ltd., Shenzhen (CN)

(72) Inventors: Haiyang Sun, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 17/131,088

(22) Filed: Dec. 22, 2020

(65) Prior Publication Data

US 2021/0112400 A1 Apr. 15, 2021

Related U.S. Application Data

(63) Continuation of application No. PCT/CN2019/092961, filed on Jun. 26, 2019.

(30) Foreign Application Priority Data

Jun. 26, 2018 (CN) .......................... 201810671993.3

(51) Int. Cl.
*H04W 8/20* (2009.01)
*H04W 8/24* (2009.01)
(Continued)

(52) U.S. Cl.
CPC ............... *H04W 8/20* (2013.01); *H04W 8/24* (2013.01); *H04W 64/003* (2013.01); *H04W 76/11* (2018.02); *H04W 84/042* (2013.01)

(58) Field of Classification Search
CPC .......... H04L 12/1407; H04M 15/8038; H04M 15/62; H04M 15/66; H04M 15/8033;
(Continued)

(56) References Cited

U.S. PATENT DOCUMENTS 9,367,573 B1 6/2016 Goyal
9,473,926 B2 10/2016 Rosar
(Continued)

FOREIGN PATENT DOCUMENTS

CN 1622527 A 6/2005
CN 1825830 A 8/2006
(Continued)

OTHER PUBLICATIONS

3GPP TS 23.503 V15.2.0 (Jun. 2018), "3rd Generation Partnership Project; Technical Specification Group Services and System Aspects; Policy and Charging Control Framework for the 5G System; Stage 2 (Release 15)," 67 pages.
(Continued)

*Primary Examiner* — Congvan Tran
(74) *Attorney, Agent, or Firm* — HUAWEI TECHNOLOGIES CO., LTD.

(57) ABSTRACT

A data management method includes sending, by a first communications apparatus, first request information to a second communications apparatus, where the first request information includes subscription permanent identifier (SUPI) information of user equipment (UE), and the first request information is used to instruct the second communications apparatus to obtain, from a third communications apparatus, policy information of the UE stored in the third communications apparatus, where the policy information is stored in the third communications apparatus by using a location area as a classification, and receiving, by the first communications apparatus, the policy information sent by the second communications apparatus.

20 Claims, 7 Drawing Sheets

(51) Int. Cl.
*H04W 64/00* (2009.01)
*H04W 76/11* (2018.01)
*H04W 84/04* (2009.01)

(58) Field of Classification Search
CPC .......... H04W 8/20; H04W 8/12; H04W 8/06; H04W 4/24; H04W 8/02; H04W 8/065; H04W 8/24; H04W 76/11; H04W 64/003; H04W 84/042
See application file for complete search history.

(56) References Cited

U.S. PATENT DOCUMENTS

| | | |
|---|---|---|
| 2004/0039809 A1 | 2/2004 | Ranous et al. |
| 2008/0274736 A1 | 11/2008 | Hu |
| 2009/0327180 A1 | 12/2009 | Madison, Jr. et al. |
| 2011/0154255 A1 | 6/2011 | Ryu et al. |
| 2011/0173332 A1 | 7/2011 | Li et al. |
| 2011/0208853 A1 | 8/2011 | Castro-Castro et al. |
| 2013/0013932 A1 | 1/2013 | Kong et al. |
| 2013/0318220 A2 | 11/2013 | Meng et al. |
| 2014/0087759 A1 | 3/2014 | Blumstein et al. |
| 2014/0364079 A1 | 12/2014 | Difazio et al. |
| 2015/0271850 A1 | 9/2015 | Kim et al. |
| 2015/0350874 A1* | 12/2015 | Draznin ............... H04W 8/12 455/432.1 |
| 2016/0183169 A1 | 6/2016 | Horn et al. |
| 2017/0127371 A1 | 5/2017 | Jiang et al. |
| 2017/0289863 A1* | 10/2017 | Zhang ............... H04W 24/04 |
| 2017/0359749 A1* | 12/2017 | Dao ............... H04L 47/2416 |
| 2018/0262924 A1* | 9/2018 | Dao ............... H04W 24/08 |
| 2018/0352050 A1* | 12/2018 | Li ............... H04L 67/5682 |
| 2019/0029065 A1* | 1/2019 | Park ............... H04W 48/02 |
| 2019/0037516 A1* | 1/2019 | Kim ............... H04W 60/005 |
| 2019/0044980 A1* | 2/2019 | Russell ............... H04W 8/06 |
| 2019/0261260 A1* | 8/2019 | Dao ............... H04W 48/18 |
| 2019/0387440 A1* | 12/2019 | Yiu ............... H04W 36/165 |
| 2020/0077356 A1* | 3/2020 | Youn ............... H04W 68/02 |
| 2020/0154389 A1* | 5/2020 | Karampatsis ....... H04L 65/1073 |
| 2020/0187106 A1* | 6/2020 | Salkintzis ............... H04W 4/60 |
| 2020/0221286 A1* | 7/2020 | Gan ............... H04W 48/18 |
| 2020/0344678 A1* | 10/2020 | Kunz ............... H04W 48/18 |
| 2021/0058748 A1* | 2/2021 | Liao ............... H04W 76/11 |
| 2021/0168705 A1* | 6/2021 | Fiorese ............... H04W 12/037 |
| 2021/0211960 A1* | 7/2021 | Ryu ............... H04W 36/0011 |

FOREIGN PATENT DOCUMENTS

| | | | |
|---|---|---|---|
| CN | 101132639 A | 2/2008 | |
| CN | 101217383 A | 7/2008 | |
| CN | 101355561 A | 1/2009 | |
| CN | 101483584 A | 7/2009 | |
| CN | 101674624 A | 3/2010 | |
| CN | 101730150 A | 6/2010 | |
| CN | 101854581 A | 10/2010 | |
| CN | 102624760 A | 8/2012 | |
| CN | 103988570 A | 8/2014 | |
| CN | 104202738 A | 12/2014 | |
| CN | 104780530 A | 7/2015 | |
| CN | 105307141 A | 2/2016 | |
| CN | 106231546 A | 12/2016 | |
| CN | 106488428 A | 3/2017 | |
| CN | 107113698 A | 8/2017 | |
| CN | 107770815 A | 3/2018 | |
| CN | 107919974 A | 4/2018 | |
| EP | 2340652 B1 | 5/2013 | |
| EP | 2458913 B1 | 2/2019 | |
| JP | 2011223119 A | 11/2011 | |
| KR | 100997163 B1 | 11/2010 | |
| RU | 2760869 C1 * | 5/2018 | ........ H04W 112/037 |
| WO | 2007010340 A1 | 1/2007 | |
| WO | 2007087745 A1 | 8/2007 | |
| WO | 2008036914 A2 | 3/2008 | |
| WO | 2010031316 A1 | 3/2010 | |
| WO | 2014061994 A1 | 4/2014 | |
| WO | 2015172289 A1 | 11/2015 | |

OTHER PUBLICATIONS

3GPP TS 23.501 V15.2.0 (Jun. 2018), "3rd Generation Partnership Project; Technical Specification Group Services and System Aspects; System Architecture for the 5G System; Stage 2 (Release 15)," 216 pages.

3GPP TS 23.502 V15.2.0 (Jun. 2018), "3rd Generation Partnership Project; Technical Specification Group Services and System Aspects; Procedures for the 5G System; Stage 2 (Release 15)," 308 pages.

LG Electronics, "TS 23.502: Terminology alignment on SUPI," SA WG2 Meeting #122E e-meeting, S2-176788, Sep. 11-15, 2017, Elbonia, 4 pages.

China Mobile, "Correction of UDR usage in MM related procedures," SA WG2 Meeting #125, S2-180292, Gothenburg, Sweden, Jan. 22-26, 2018, 8 pages.

Huawei, et al., "Clarification on Application data," SA WG2 Meeting #127, S2-183358, Sanya, China, Apr. 16-20, 2018, 6 pages.

China Mobile, et al., "Clarification of UDR usage in policy related procedures," 3GPP TSG-SA WG2 Meeting #126, Montreal, Canada, Feb. 26-Mar. 2, 2018, S2-182624, 18 pages.

Huawei, et al., "Correction on Policy association procedure during AMF relocation," 3GPP TSG-SA2 Meeting #126, Montreal, Canada, Feb. 26-Mar. 2, 2018, S2-181573, 16 pages.

Huawei, et al., "Description of Policy Association," 3GPP TSG-SA WG2 Meeting #127, Sanya, China, Apr. 16-20, 2018, S2-184199, 65 pages.

3GPP TS 29.519 V15.0.0, Jun. 2018, "3rd Generation Partnership Project; Technical Specification Group Core Network and Terminals; 5G System; Usage of the Unified Data Repository service for Policy Data, Application Data and Structured Data for Exposure; Stage 3 (Release 15)," 42 pages.

Zhou, F., et al: "Progress of Big Data Storage Technology", 2015, 11 pages.

3GPP TS 23.003 V15.4.0 (Jun. 2018), 3rd Generation Partnership Project; Technical Specification Group Core Network and Terminals; Numbering, addressing and identification(Release 15), 120 pages.

* cited by examiner

SUBSCRIBER DATA MANAGEMENT METHOD AND APPARATUS

CROSS-REFERENCE TO RELATED APPLICATIONS

This application is a continuation of International Patent Application No. PCT/CN2019/092961 filed on Jun. 26, 2019, which claims priority to Chinese Patent Application No. 201810671993.3 filed on Jun. 26, 2018, both of which are hereby incorporated by reference in their entireties.

TECHNICAL FIELD

Embodiments of this application relate to the field of communications technologies, and in particular, to a subscriber data management method and apparatus.

BACKGROUND

In a fifth generation (5G) communication system, a mechanism for preventing repeated delivery of a user equipment (UE) policy is introduced. The mechanism includes a policy control function (PCF) apparatus stores, in a unified data repository (UDR), a policy section identifier (PSI) of a UE policy successfully delivered to UE and corresponding policy content. The UDR stores the delivered PSI and the corresponding policy information to prevent repeated delivery of the UE policy. The PSI of the UE policy and the corresponding policy content that are stored in the UDR are not deleted even if the UE is powered off. In addition, an access and mobility management function (AMF) deletes subscription information and a mobility management (MM) context after the UE is deregistered. In this case, the AMF triggers a "purge of subscriber data in AMF" procedure, and the procedure is used to delete the subscription information and the MM context.

In a roaming scenario, a visited PCF (V-PCF) stores, in a visited UDR (V-UDR), a PSI of a UE policy that has been delivered by a visited public land mobile network (VPLMN) and corresponding policy content. However, the UE moves from one VPLMN to another VPLMN, or moves back from the VPLMN to a local home public land mobile network (HPLMN). In this case, the PSI and the corresponding policy content that are stored in the V-UDR are no longer valuable. However, the PSI and the corresponding policy information content in the V-UDR are retained because there is no corresponding deletion mechanism. Storage space of the V-UDR is limited. When there are a large quantity of roaming subscribers and an update is relatively fast, a large quantity of storage resources of the V-UDR are wasted.

SUMMARY

Embodiments of this application provide a data management method and apparatus, so as to save storage resources.

According to a first aspect, a data management method is provided. The method includes sending, by a first communications apparatus, first request information to a second communications apparatus, where the first request information includes subscription permanent identifier (SUPI) information of UE, and the first request information is used to instruct the second communications apparatus to obtain, from a third communications apparatus, policy information of the UE stored in the third communications apparatus, where the policy information is stored in the third communications apparatus by using a location area as a classification, and receiving, by the first communications apparatus, the policy information sent by the second communications apparatus.

It can be learned that in the technical solution, the first communications apparatus and the second communications apparatus obtain the policy information from the third communications apparatus, and the policy information in the third communications apparatus is not stored by using a granularity of each UE as a classification, and redundant information is not stored all the time, thereby improving obtaining efficiency and saving storage space.

According to a second aspect, a data management method is provided. The method includes receiving, by a second communications apparatus, first request information sent by a first communications apparatus, where the first request information includes SUPI information of UE, sending, by the second communications apparatus, second request information to a third communications apparatus, where the second request information includes at least one of public land mobile network (PLMN) identity (ID) information of a PLMN currently serving the UE, current location area information of the UE, and UE capability information, and the second request information is used to request, from the third communications apparatus, policy information of the UE stored in the third communications apparatus, where the policy information is stored in the third communications apparatus by using a location area as a classification, receiving, by the second communications apparatus, the policy information sent by the third communications apparatus, and sending, by the second communications apparatus, the policy information to the first communications apparatus.

According to a third aspect, a data management method is provided. The method includes receiving, by a third communications apparatus, second request information sent by a second communications apparatus, where the second request information includes at least one of PLMN ID information of a land mobile network currently serving UE, location area information, and UE capability information, and sending, by the third communications apparatus to the second communications apparatus, policy information of the UE that is stored by using a location area as a classification.

It can be learned that in the technical solution, the policy information in the third communications apparatus is not stored by using a granularity of each UE as a classification, and redundant information is not stored all the time, thereby improving obtaining efficiency and saving storage space.

In a possible design, the method may further include the policy information of the UE stored by the third communications apparatus corresponds to at least one data keyword, the third communications apparatus locates the policy information of the UE by using the data keyword, and the data keyword includes at least one of the PLMN ID information, the location area information, and the UE capability information.

It can be learned that, by designing a keyword, the policy information can be stored based on the location area, and requested information can be more easily obtained by using the keyword, thereby improving efficiency.

According to a fourth aspect, a data management method is provided. The method includes sending, by a first communications apparatus, first instruction information to a second communications apparatus, where the first instruction information is used to instruct the second communications apparatus to trigger deletion of policy information of UE stored in a third communications apparatus, and the UE moves from one VPLMN to another VPLMN, or moves back from a VPLMN to an HPLMN.

In this solution, the first communications apparatus sends the instruction information to the second communications apparatus, so that the second communications apparatus learns that the policy information of the UE stored in the third communications apparatus is invalid, thereby initiating deletion.

According to a fifth aspect, a data management method is provided. The method includes receiving, by a second communications apparatus, first instruction information sent by a first communications apparatus, where the instruction information is used to instruct the second communications apparatus to trigger deletion of policy information of UE stored in a third communications apparatus, and triggering, by the second communications network, deletion of the policy information of the UE stored in the third communications apparatus.

In a possible design, the triggering, by the second communications network, deletion of the policy information of the UE stored in the third communications apparatus may be implemented in a manner in which the second communications apparatus sends second instruction information to the third communications apparatus, where the second instruction information is used to instruct the third communications apparatus to delete the policy information of the UE.

According to a sixth aspect, a data management apparatus is provided. The session management apparatus may be configured to perform any method provided in the first aspect. The session management apparatus may be specifically the data management apparatus described in the first aspect.

In a possible design, function modules of the session management apparatus may be divided based on the method provided in the first aspect. For example, each function module may be obtained through division based on a corresponding function, or two or more functions may be integrated into one processing module.

In another possible design, the data management apparatus may include a transceiver and a processor, where the memory is configured to store a computer program, and when the computer program is executed by the processor, any method provided in the first aspect is performed.

According to a seventh aspect, an embodiment of this application provides a data management apparatus. The data management apparatus may be configured to perform any method provided in the second aspect.

In a possible design, function modules of the access network (AN) device may be divided based on the method provided in the second aspect. For example, each function module may be obtained through division based on a corresponding function, or two or more functions may be integrated into one processing module.

In another possible design, the AN device may include a memory and a transceiver, where the memory is configured to store a computer program, and when the computer program is executed by the processor, any method provided in the second aspect is performed.

According to an eighth aspect, an embodiment of this application provides a data management apparatus. The apparatus may be configured to perform any method provided in the third aspect.

In a possible design, function modules of the apparatus may be divided based on the method provided in the third aspect. For example, each function module may be obtained through division based on a corresponding function, or two or more functions may be integrated into one processing module.

In another possible design, the apparatus may include a memory and a processor, where the memory is configured to store a computer program, and when the computer program is executed by the processor, any method provided in the third aspect is performed.

According to a ninth aspect, an embodiment of this application provides a data management apparatus. The apparatus may be configured to perform any method provided in the fourth aspect.

In a possible design, function modules of the apparatus may be divided based on the method provided in the fourth aspect. For example, each function module may be obtained through division based on a corresponding function, or two or more functions may be integrated into one processing module.

In another possible design, the apparatus may include a memory and a processor, where the memory is configured to store a computer program, and when the computer program is executed by the processor, any method provided in the third aspect is performed.

According to a tenth aspect, an embodiment of this application provides a data management apparatus. The apparatus may be configured to perform any method provided in the fifth aspect.

In a possible design, function modules of the apparatus may be divided based on the method provided in the fifth aspect. For example, each function module may be obtained through division based on a corresponding function, or two or more functions may be integrated into one processing module.

In another possible design, the apparatus may include a memory and a processor, where the memory is configured to store a computer program, and when the computer program is executed by the processor, any method provided in the third aspect is performed.

According to an eleventh aspect, an embodiment of this application provides a data management system, where the system may include the first communications apparatus, the second communications apparatus, and the third communications apparatus in the first aspect to the third aspect and corresponding apparatuses.

According to a twelfth aspect, an embodiment of this application provides a data management system, where the system may include the first communications apparatus, the second communications apparatus, and the third communications apparatus in the fourth aspect and the fifth aspect and corresponding apparatuses.

An embodiment of this application further provides a processing apparatus, to implement functions of the foregoing apparatus. The processing apparatus may include a processor and an interface. The processing apparatus may be a chip, and the processor may be implemented by hardware, or may be implemented by software. When the processor is implemented by hardware, the processor may be a logic circuit, an integrated circuit, or the like. When the processor is implemented by software, the processor may be a general processor, and is implemented by reading software code stored in a memory. The memory may be integrated in the processor, or may be located outside the processor and independently exist.

An embodiment of this application further provides a computer readable storage medium. The computer readable storage medium stores a computer instruction. When the computer instruction is run on a computer, the computer is enabled to perform any one of the foregoing possible methods in the first aspect to the third aspect.

An embodiment of this application further provides a computer program product. When the computer program product is run on a computer, the method provided in any one of the first aspect to the third aspect is performed.

This application further provides a chip system. The chip system may include a processor, configured to implement, by using a communications apparatus, functions used in the foregoing aspects, for example, generating, receiving, sending, or processing data and/or information used in the foregoing methods. In a possible design, the chip system further includes a memory, and the memory is configured to store a program instruction and data that are required by the communications apparatus. The chip system may include a chip, or may include a chip and another discrete device. The chip system may alternatively be an apparatus.

It may be understood that, any apparatus or system or computer storage medium or computer program product provided above is used for performing the corresponding methods provided above. Therefore, for beneficial effects that can be achieved by the apparatus or system or computer storage medium or computer program product, refer to beneficial effects of the corresponding methods. Details are not described herein again.

It should be noted that, the foregoing devices that are provided in the embodiments of this application and that are configured to store the computer instruction or the computer program, for example, but not limited to, the foregoing memory, computer readable storage medium, and communications chip, are all non-transitory.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Figure 1:
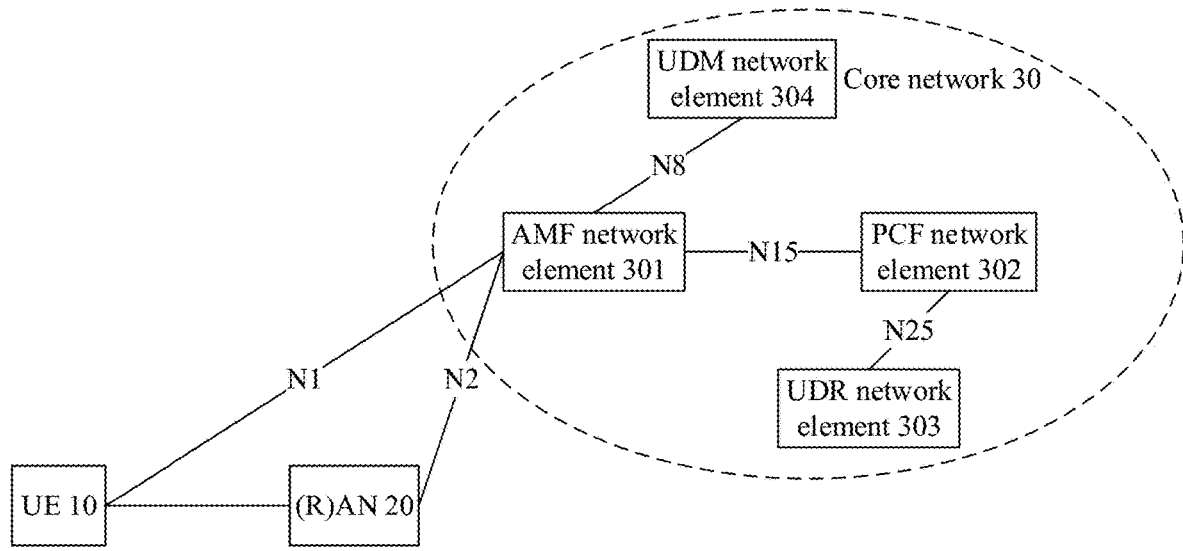
FIG. 1 is a schematic architectural diagram of a 5G communications system.

Technical solutions provided in embodiments of this application may be applied to a wireless communications system, and the wireless communications system may be a 5G system or another future communications system. Certainly, the wireless communications system may alternatively be a long term evolution (LTE) system, an LTE evolution (LTE-A) system, or the like. An example in which the wireless communications system is a 5G system is used. FIG. 1 is a schematic architectural diagram of a communications system to which a technical solution provided in an embodiment of this application is applicable. In FIG. 1, the communications system may include UE 10, a radio access network (RAN) or an AN 20 (which is referred to as (R)AN 20 below), and a core network 30. The core network 30 includes an AMF apparatus 301, a PCF apparatus 302, a UDR apparatus 303, a unified data management (UDM) apparatus 304, and the like. The UE 10 communicates with the AMF apparatus 301 by using a next-generation network interface 1 (N1). The (R)AN 20, specifically, an apparatus in the (R)AN 20, communicates with the AMF apparatus 301 through an N2 interface (N2), and the AMF apparatus 301 communicates with the PCF apparatus 302 through an N15 interface (N15). The PCF apparatus 302 communicates with the UDR apparatus 303 through an N25 interface (N25). The AMF apparatus 301 communicates with the UDM apparatus 304 through an N8 interface (N8). A connection between the foregoing apparatuses may be a wireless connection or a wired connection. To conveniently and intuitively represent a connection relationship between the apparatuses, a solid line is used as an example in FIG. 1.

The UE 10 is a terminal, and may include a handheld device, vehicle-mounted device, wearable device, or computing device having a wireless communication function, or another processing device connected to a wireless modem. The terminal may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) console, a machine type communication (MTC) terminal, UE, a mobile station (MS), a terminal device, relay UE, or the like. The relay UE may be, for example, a 5G residential gateway (RG). For ease of description, in this application, these terminals are collectively referred to as UEs.

The (R)AN 20 is used by the UE 10 to access a network. An apparatus in the (R)AN 20 may be, for example, but is not limited to, a base station, an evolved NodeB (eNB), a next-generation NodeB (gNB), a new radio NodeB, a macro base station, a micro base station, a high frequency base station or a transmission and reception point (TRP), a non-Third Generation Partnership Project (3GPP) AN (for example, WI-FI) and/or non-3GPP interworking function (N3IWF), or other devices.

The AMF apparatus 301 is configured for connection management, mobility management, registration management, access authentication and authorization, reachability management, security context management, and the like. Usually, one AMF apparatus 301 provides a service for a same UE 10. Optionally, in a roaming scenario, two AMF apparatuses 301 may also simultaneously provide services for a same UE 10. With a change of a location of the UE 10, the AMF apparatus 301 serving the UE 10 may be replaced. Specifically, the (R)AN 20 may execute a process of selecting the AMF apparatus 301. In addition, in some embodiments provided in this application, the AMF apparatus 301 may store policy information of the UE 10, for example, store specific policies that have been currently configured for the UE 10, and optionally, may further store specific policies that currently need to be configured but have not been configured for the UE 10. The policy information of the UE 10 stored in the AMF apparatus 301 may be updated with an update of a policy configured by a network side for the UE 10. For a specific example, reference may be made to the following part. The policy configured by the network side for the UE 10 may include a policy configured by the PCF apparatus 302 (including a PCF apparatus that once provided a service for the UE 10 and a PCF apparatus 302 that currently provides a service for the UE 10) on the network side for the UE. The policy information of the UE 10 may be used to indicate the policy of the UE, for example, at least one of an AN discovery and selection policy (ANDSP), a UE route selection policy (URSP), and a wireless local area network selection policy (WLANSP), or certainly, may be another policy. This is not limited in this application.

The PCF apparatus 302 is configured to formulate a policy, provide a policy control service, obtain subscription information related to policy decision, and the like. A policy that needs to be configured for the UE 10 and that is determined by the PCF apparatus 302 may be updated. For example, the PCF apparatus 302 updates, based on the change of the location of the UE 10, a change of the subscription information of the UE 10, and the like, the policy that needs to be configured for the UE 10. For example, at a moment, the PCF apparatus 302 determines, based on a current location of a UE 10 and subscription information of the UE 10, that the policies that need to be configured for the UE 10 are policies 1 to 10. At another moment, because the subscription information of the UE 10 is changed, the policies that need to be configured for the UE 10 and that are determined by the PCF apparatus 302 are policies 5 to 11. The PCF apparatus 302 may configure the policies for the UE 10 in a plurality of times, and store information about a policy that has been configured for the UE 10 by the PCF apparatus 302. For example, if at a moment, the policies that need to be configured for the UE 10 and that are determined by the PCF apparatus 302 are the policies 1 to 10, the PCF apparatus 302 may send policies 1 to 3 to the UE 10 for the first time, and send policies 4 to 10 to the UE for the second time. In addition, based on a reason such as the change of the location of the UE 10, the PCF apparatus 302 providing a policy control service for the UE 10 may also be replaced. Specifically, the AMF apparatus 301 may execute a process of selecting the PCF apparatus.

The UDR apparatus 303 is configured to provide subscription data for the UDM apparatus 304 or obtain subscription data from the UDM apparatus 304, and provide policy data for the PCF apparatus 302, or obtain policy data from the PCF apparatus 302. In addition, in some embodiments provided in this application, the UDR apparatus 303 may store the policy information of the UE 10.

The UDM apparatus 304 is configured to process authentication information, subscriber identity information, access authorization, registration and mobility management, subscription management, and short message management in a 3GPP authentication and key agreement mechanism.

Although not shown, the 5G network may further include other apparatuses, for example, a user plane function (UPF) apparatus, an authentication service function (AUSF) apparatus, an application function (AF) apparatus, a network exposure function (NEF) apparatus, a network slice selection function (NSSF) apparatus, and the like. This is not specifically limited in this embodiment of this application.

It should be noted that, names of interfaces between the apparatuses in FIG. 1 are merely examples, and in specific implementation, the names of the interfaces may be other names. This is not specifically limited in this embodiment of this application.

It should be noted that, the AMF apparatus 301, the PCF apparatus 302, the UDR apparatus 303, the UDM apparatus 304, and the like in FIG. 1 are merely names of devices, and the names do not limit the devices. In the 5G network and other future networks, apparatuses or entities corresponding to the AMF apparatus 301, the PCF apparatus 302, the UDR apparatus 303, and the UDM apparatus 304 may also have other names. This is not specifically limited in this embodiment of this application. For example, the AMF apparatus 301 may alternatively be replaced with an AMF 301, and the like. This is uniformly described herein, and details are not described below.

Optionally, the apparatuses (for example, the UE 10, the AMF apparatus 301, the PCF apparatus 302, the UDR apparatus 303, and the UDM apparatus 304) in FIG. 1 may be implemented by one device, or may be jointly implemented by a plurality of devices, or may be a function module in a device. This is not specifically limited in this embodiment of this application. It may be understood that the foregoing functions may be network elements in a hardware device, or may be software functions running on dedicated hardware, or may be instantiated virtualization functions on a platform (for example, a cloud platform).

It may be understood that, although not shown, the 5G network may further include other apparatuses, for example, a NS SF apparatus, a network repository function (NRF) apparatus, an AUSF apparatus, an AF apparatus, a NEF apparatus, and the like. This is not specifically limited in this embodiment of this application.

It should be noted that, names of interfaces between the apparatuses in FIG. 1 are merely examples, and in specific implementation, the names of the interfaces may be other names. This is not limited in this embodiment of this application.

It should be noted that, the apparatuses in FIG. 1, for example, the terminal, the RAN device, the AMF apparatus, the session management function (SMF) apparatus, the PCF apparatus, the UDM apparatus, and the UDR apparatus, are merely names of devices, and the names do not limit the devices. In the 5G network and other future networks, these apparatuses may also have other names. This is not specifically limited in this embodiment of this application. For example, the AMF apparatus may alternatively be replaced with an AMF or an AMF entity, and the SMF apparatus may alternatively be replaced with an SMF or an SMF entity. This is uniformly described herein, and details are not described below.

Figure 2:
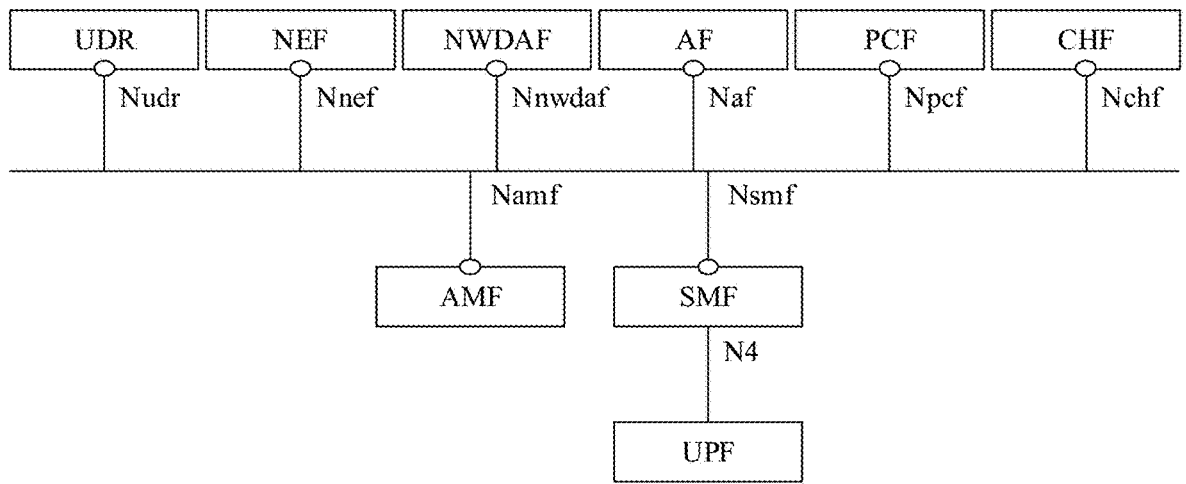
FIG. 2 is a schematic diagram of a 5G policy control architecture.

FIG. 2 is a schematic diagram of a 5G policy control architecture. There is a network data analytics function (NWDAF) apparatus in a network architecture related to policy control. The NWDAF can analyze big data, and can send analysis information obtained based on analysis to a PCF apparatus in the network architecture. The PCF can generate a policy based on the analysis information sent by the NWDAF, and can send the generated policy to a policy control execution apparatus, for example, an AMF, a SMF, or the like in the network architecture. The policy control execution apparatus may control execution of the policy.

Figure 3:
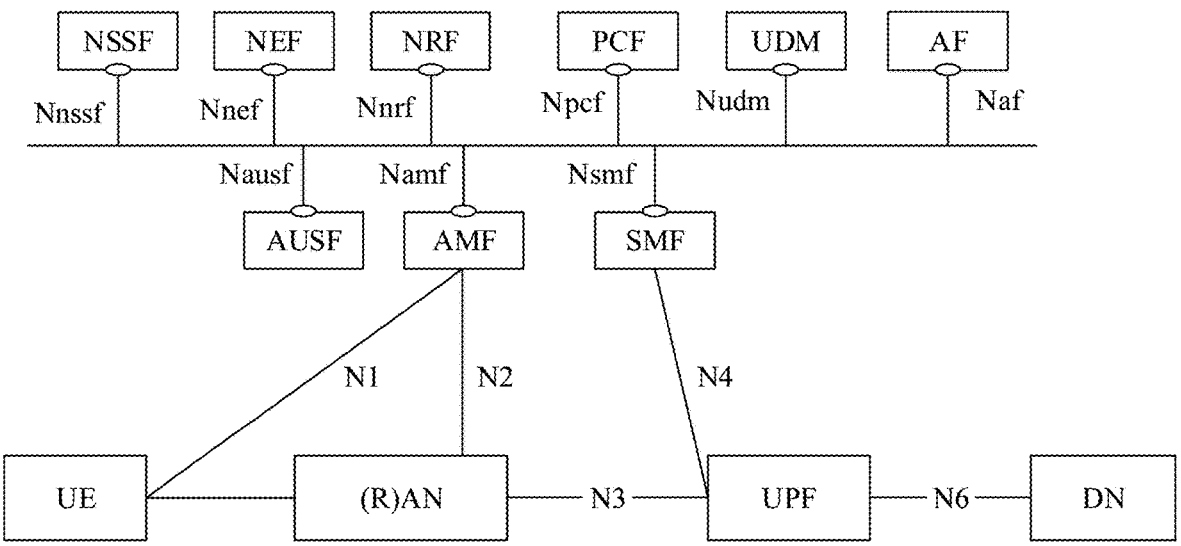
FIG. 3 is a schematic diagram of a 5G network architecture based on a service-based interface in a non-roaming scenario.

FIG. 3 is a schematic diagram of a 5G network architecture based on a service-based interface in a non-roaming scenario. As shown in FIG. 3, in the scenario based on the service-based interface, the core network of the 5G system further includes a NEF apparatus and an NRF apparatus. In the scenario based on the service-based interface, some apparatuses in the 5G core network are connected in a bus manner. As shown in FIG. 3, the AUSF apparatus, the AMF apparatus, the SMF apparatus, the AF apparatus, the UDM, the PCF apparatus, the NRF apparatus, the NEF apparatus, and the NSSF apparatus are interconnected by using a bus. When the apparatuses are interconnected by using the bus, a service-based interface is used. For example, the AUSF apparatus is connected to the bus through a Nausf interface, the AMF apparatus is connected to the bus through a Namf interface, the SMF apparatus is connected to the bus through an Nsmf interface, the AF apparatus is connected to the bus through an Naf apparatus interface, the UDM is connected to the bus through a Nudm interface, the PCF apparatus is connected to the bus through an Npcf apparatus interface, the NRF is connected to the bus through an Nnrf interface, the NEF is connected to the bus through a Nnef interface, and the NSSF is connected to the bus through an Nnssf interface.

Based on a roaming service access policy of a mobile terminal, two roaming modes are available home routed roaming access and local breakout roaming access. The home routed roaming access means that a roaming subscriber accesses a home network through a gateway (or another with a same function as that of the gateway) of the home network to obtain a service provided by the home network. The local breakout roaming access means that a roaming subscriber accesses a visited network through a gateway of the visited network to obtain a corresponding service. A provider of the service may be the home network, or may be the visited network.

Figure 4:
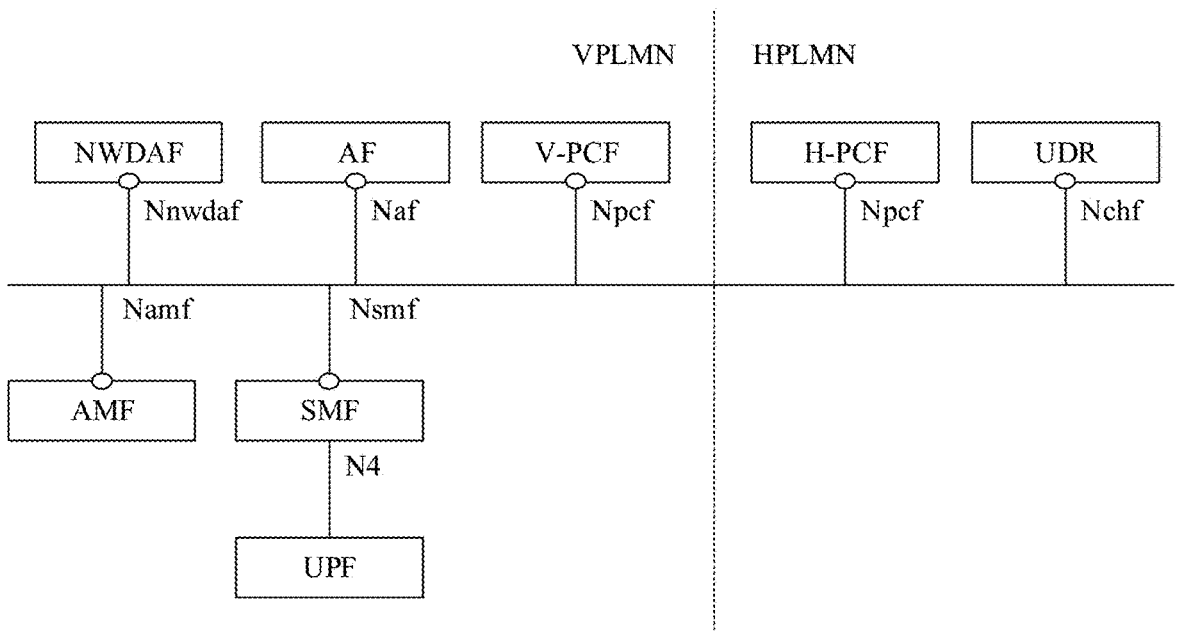
FIG. 4 is a schematic diagram of a 5G policy control architecture based on a service-based interface in a local breakout roaming scenario.

FIG. 4 is a schematic diagram of a 5G policy control architecture based on a service-based interface in a local breakout roaming scenario. As shown in FIG. 4, PCFs are separately located in a VPLMN and a HPLMN. There are two PCFs for controlling access and mobility policy control, and the PCFs are separately located in the VPLMN and the HPLMN, that is, a V-PCF and a home PCF (H-PCF).

Figure 5:
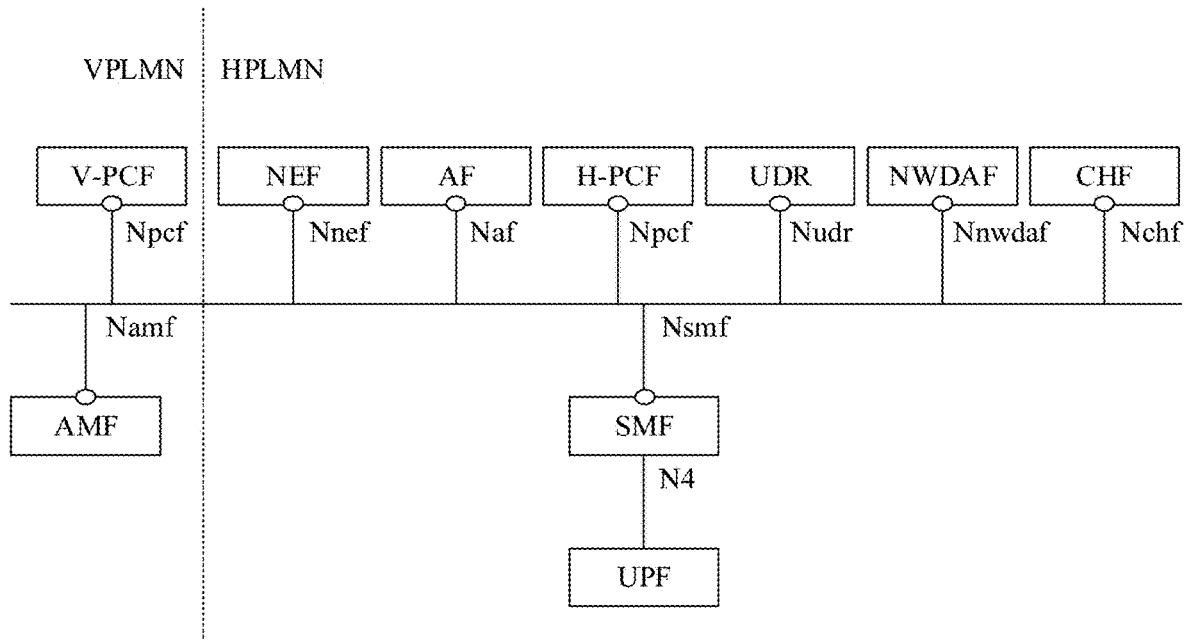
FIG. 5 is a schematic diagram of a 5G policy control architecture based on a service-based interface in a home routed roaming scenario.

FIG. 5 is a schematic diagram of a 5G policy control architecture based on a service-based interface in a home routed roaming scenario. As shown in FIG. 5, there are two PCFs for controlling access and mobility policy control, and the PCFs are separately located in the VPLMN and the HPLMN, that is, a V-PCF and an H-PCF.

When a method in this application is applied to an LTE system, the core network is an evolved packet core network EPC, and includes a mobility management entity (MME), a packet data network gateway (P-GW), a serving gateway (S-GW), a home network server (HSS), and the like. The HSS is configured to store user subscription information, including user service information, authentication information, location management information, and the like. The MME is responsible for functions such as terminal access control, mobility management, session management, and apparatus selection (for example, S-GW/P-GW selection). The S-GW is a mobility anchor for handover between eNBs, and is responsible for functions such as routing and forwarding of user plane data. The P-GW is responsible for functions such as internet protocol (IP) address allocation, packet data filtering, rate control, charging rule execution, and lawful interception.

The UE mentioned in this application may be a mobile phone or a computer, or may be a cellular phone, a cordless phone, a session initiation protocol (SIP) phone, a smartphone, a WLL station, a PDA, a computer, a laptop computer, a handheld communications device, a handheld computing device, a satellite wireless device, a wireless modem card, a television set-top box (STB), a vehicle-mounted device, a wearable device, a smart home device, another device used for communication in a wireless system, or the like.

Figure 6:
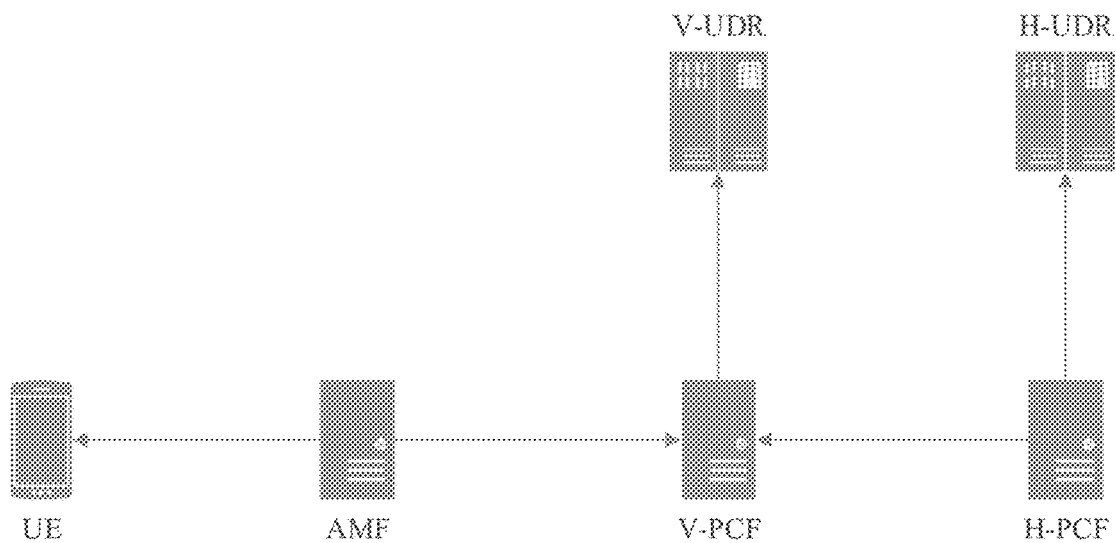
FIG. 6 is a schematic diagram of a storage architecture of policy information.

FIG. 6 is a schematic diagram of a storage architecture of policy information. In a roaming scenario, the V-PCF stores a PSI of UE policy information delivered by the VPLMN and corresponding policy content in a V-UDR, and does not delete the PSI and the corresponding policy content. In addition, the PCF stores the delivered PSI and the corresponding policy information in the UDR to prevent repeated delivery of the UE policy. The content in the UDR is not deleted even if the UE is powered off. The UE moves from one VPLMN to another VPLMN, or moves back from the VPLMN to the HPLMN. In this case, the PSI of the UE and the corresponding policy content stored in the V-UDR are no longer valuable, and occupy storage resources.

Figure 7:
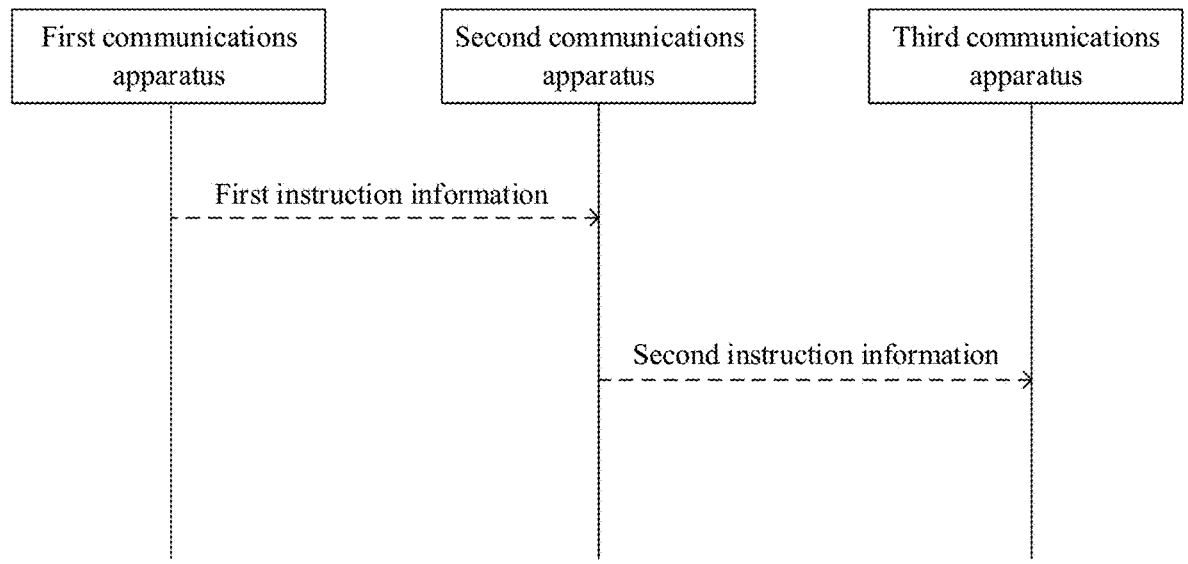
FIG. 7 is a schematic flowchart of an example of a data management method.

FIG. 7 is a flowchart of a data management method according to an embodiment of this application. In the embodiment shown in FIG. 7, a first communications apparatus sends first instruction information to a second communications apparatus, where the first instruction information is used to instruct the second communications apparatus to trigger deletion of policy information of UE stored in a third communications apparatus, and the policy information of the UE is UE policy information of UE that accesses the second communications apparatus in a roaming domain. The second communications apparatus receives the first instruction information, and triggers deletion of the policy information of the UE stored in the third communications apparatus.

In the embodiment shown in FIG. 7, the first communications apparatus sends the first instruction message to the second communications apparatus, to instruct, by using the first instruction message, the second communications apparatus to trigger a deletion procedure. The second communications apparatus initiates the deletion procedure to the third communications apparatus, so that the policy information of the UE in the third communications apparatus is deleted, therefore, storage resources of the third communications apparatus are saved.

Figure 8:
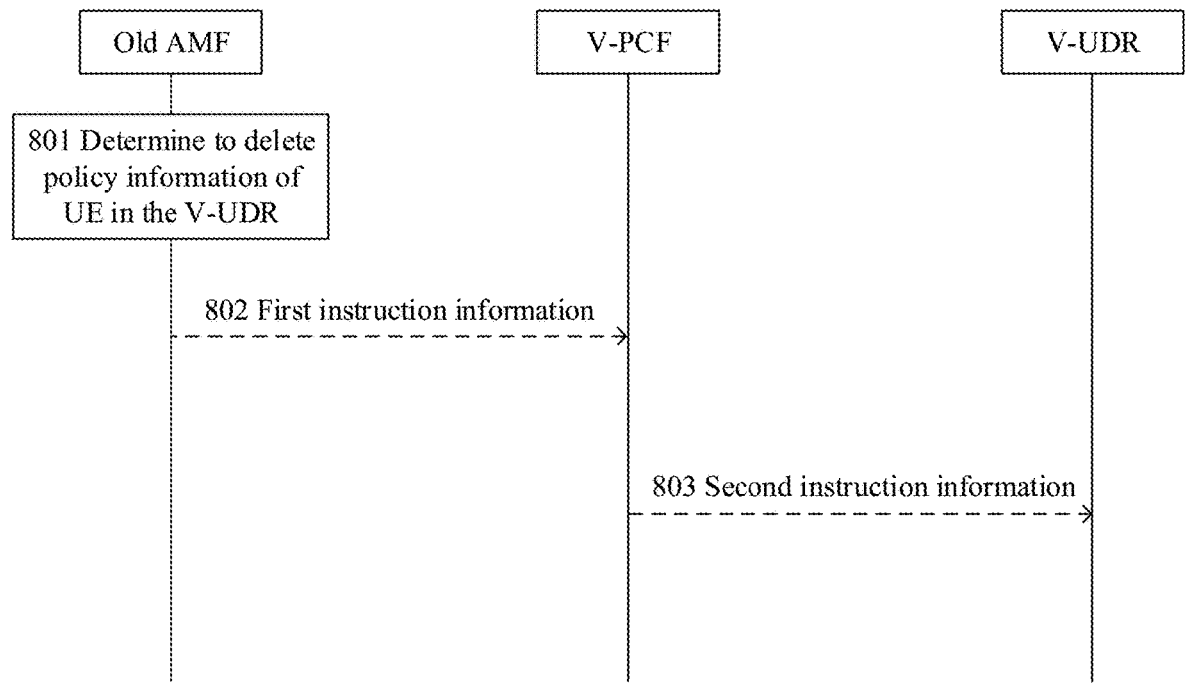
FIG. 8 is a schematic flowchart of another example of a data management method.

FIG. 8 is a schematic flowchart of a data management method according to an embodiment of this application. In this embodiment, an example in which the method is applied to a 5G architecture is used. A first communications apparatus is an AMF, and is an AMF that is accessed by UE before the UE accesses a current AMF (a new AMF), in other words, an old AMF. A second communications apparatus is a PCF, and is a V-PCF of a VPLMN. A third communications apparatus is a UDR, and is a V-UDR of the VPLMN.

801. The old AMF determines to delete policy information of the UE in the V-UDR.

In an optional implementation, the old AMF receives PLMN ID information or UDR group ID information sent by the new AMF, where the PLMN ID information or the UDR group ID information may be included in a UE context request message sent by the new AMF to the old AMF, for example, the PLMN ID information or the UDR group ID information is sent in a UE registration process. The PLMN ID information or the UDR group ID information may alternatively be included in another message for sending, or sent as an independent message to the old AMF. The PLMN ID information sent by the new AMF is PLMN ID information of a PLMN that currently serves the UE, that is, PLMN ID information of a PLMN in which the new AMF is located. The UDR group ID information is identification information of a UDR group including one or more UDRs that can currently serve the UE.

When the old AMF receives the PLMN ID information sent by the old AMF, the old AMF determines, based on the PLMN ID information, whether the policy information of the UE needs to be deleted, that is, determines whether to send first instruction information to the V-PCF. When the received PLMN ID is different from PLMN ID information stored by the old AMF, the old AMF determines that the policy information of the UE needs to be deleted, that is, the old AMF determines that the first instruction information needs to be sent to the V-PCF.

A roaming domain operator may use different UDRs to store information about different UEs, and may change, based on information such as a region, UDRs that serve a same subscriber. A UDR group includes one or more UDRs that may serve the subscriber. If different AMFs correspond to same UDR group ID information, V-UDRs serving the UEs that are in corresponding locations are also the same. When the old AMF receives the UDR group ID information sent by the new AMF, the old AMF determines, based on the UDR group ID information, whether the policy information of the UE needs to be deleted, that is, determines whether to send the first instruction information to the V-PCF. When the received UDR group ID information is different from UDR group ID information stored by the old AMF, the old AMF determines that the policy information of the UE needs to be deleted, that is, the old AMF determines that the first instruction information needs to be sent to the V-PCF.

The new AMF may alternatively send the PLMN ID information and the UDR group ID information to the old AMF, and the old PCF may determine, based on at least one of the PLMN ID information and the UDR group ID information, whether to send the first instruction information to the V-PCF.

In another optional implementation, the PLMN ID information of the PLMN currently serving the UE is configured in the old AMF. PLMN ID information corresponding to another AMF connected to an interface of the old AMF is configured on the old AMF. Table 1 illustrates a configuration manner by using an example. An AMF 1 may be the old AMF, and an AMF 2 and an AMF 3 are other AMFs. Each AMF has corresponding PLMN ID information, for example, PLMN ID information corresponding to the AMF 1 is PLMN 1, PLMN ID information corresponding to the AMF 2 is PLMN 2, and PLMN ID information corresponding to the AMF 3 is PLMN 3. In Table 1, only three AMFs are used as an example. In addition, Table 1 may alternatively not include the old AMF. When the PLMN ID information of the new AMF in Table 1 is different from the PLMN ID information of the old AMF, the old AMF sends the first instruction information to the V-PCF.

TABLE 1

| AMF ID | PLMN ID |
|---|---|
| AMF 1 (which may be the old AMF) | PLMN 1 |

TABLE 1-continued

| AMF ID | PLMN ID |
|---|---|
| AMF 2 | PLMN 1 |
| AMF 3 | PLMN 2 |

In another optional implementation, when the old AMF decides to delete subscription information and a MM context of the UE, or in a process of deleting subscription information and an MM context of the UE, or after deleting subscription information and an MM context of the UE, the old AMF sends the first instruction information to the V-PCF. The old AMF deletes the subscription information and the MM context of the UE after the UE is deregistered. The old AMF triggers a "purge of subscriber data in AMF (Purge of subscriber data in AMF)" procedure to delete the subscription information and the MM context of the UE. The "purge of subscriber data in AMF" procedure is specifically as follows. The old AMF sends Nudm_SDM_Unsubscribe request information to a UDM, and the UDM sends Nudm_SDM_Unsubscribe response information to the old AMF. The old AMF sends Nudm_UECM_Deregistration request information to the UDM, and the UDM sends Nudm_UECM_Deregistration response information to the old AMF.

802. The old AMF sends a first instruction message to the V-PCF, where the first instruction message is used to instruct the V-PCF to trigger deletion of the policy information of the UE stored in the V-UDR.

In an optional implementation, when initiating AM policy association termination to the V-PCF, the old AMF sends Npcf_AMPolicyControl_Delete information to the V-PCF, where the Npcf_AMPolicyControl_Delete information may include the first instruction information. The first instruction information may be a V-UDR deletion indication, for example, a PLMN change indication or a UDR group change indication, to instruct the V-PCF to trigger deletion of the policy information of the UE stored in the V-UDR. A policy control request trigger may be used as the first instruction information, and the policy control request trigger may be conventionally set, or whether to set the policy control request trigger may be determined by the V-PCF. The policy control request trigger is specifically shown in Table 2.

TABLE 2

| Policy control request trigger | Description |
|---|---|
| PLMN change | The PLMN currently serving the UE has changed |
| UDR group change | A current serving V-UDR needs to be changed |

The first instruction information may alternatively be included in another message sent by the old AMF to the V-PCF, or sent as a separate message. In addition, the first instruction information includes an ID of the UE, for example, SUPI information.

803. When the V-PCF receives the first instruction message, the V-PCF triggers deletion of the policy information of the UE stored in the V-UDR.

In an optional implementation, the V-PCF sends second instruction information to the V-UDR to trigger the V-UDR to delete the policy information of the UE, where the second instruction information is used to instruct the V-UDR to delete the policy information of the UE. Optionally, the second instruction information further includes the ID of the UE, for example, the SUPI information.

The V-PCF may trigger deletion of the policy information of the UE stored in the V-UDR by using a Nudr_DM_Delete service. The V-PCF sends Nudr_DM_Delete information to the V-UDR, where the Nudr_DM_Delete message is the second instruction information. In the Nudr_DM_Delete information, a data set is policy data, and a data subset is "policy set entry". After receiving the Nudr_DM_Delete information, the V-UDR deletes policy information corresponding to the SUPI of the UE, to be specific, deletes a PSI and the policy information of the UE corresponding to the PSI that are stored in the V-UDR. After completing the deletion, the V-UDR may send first feedback information of the deletion to the V-PCF, to notify the V-PCF that the deletion is completed. The V-PCF may also send second feedback information to the old AMF, to notify the old AMF that the deletion is completed. The second feedback information may be Npcf_AMPolicyControl_Delete response information, or may be included in Npcf_AMPolicyControl_Delete response information.

This application further provides another embodiment. In this embodiment, a third communications apparatus is configured to store policy information of UE. The third communications apparatus may be configured to store the policy information by using a location area in which the UE is located as a classification, that is, by using the location area as a granularity. The configuration may be that a gateway provides the third communications apparatus with the policy information by inputting the policy information or in other manners, so that the policy information is stored in the third communications apparatus. The location area is used as a classification standard for storage, and the storage may be implemented by using the location area as a keyword. By retrieving policy information that uses the area location as a keyword, the required policy information is located. In this form of storage, storage resources are greatly saved, and required information can be efficiently located.

The third communications apparatus may be a UDR, and may be used as a V-UDR. If the V-UDR stores the policy information by using each UE as a classification, the V-UDR needs to store a large amount of useless policy information because a roaming subscriber may leave a VPLMN. In this embodiment, the V-UDR stores only ANDSP capability information of all roaming subscribers, and classifies the information based on a PLMN ID or location area information. A V-PCF does not need to store PSI information and content corresponding to the PSI information for each UE area. A PCF determines, based on the PLMN to which the UE belongs and a current location of the UE, policy information provided for the UE, and may obtain the policy information from the V-UDR and provide the policy information for the UE.

Table 3 is an example of a storage form in which the policy information of the UE is stored in a location granularity. Information such as the PLMN ID, location area, UE capability, and PSI content is directly sorted and classified, and the policy information of the UE is stored based on different location area categories. For example, policy information of UEs located in tracking areas 1, 2, and 3 may be stored corresponding to the tracking areas 1, 2, and 3, and the policy information of the UEs located in a cell 101 may be stored corresponding to the cell 101. Different pieces of policy information may be identified by using PSIs, for example, a PSI 1 and a PSI 2. As shown in Table 2, the tracking areas 1, 2, and 3 correspond to the policy information PSIs 1, 2, and 3, to be specific, the policy information indicated by the PSI 1, the PSI 2, and the PSI 3 is policy information of the UEs located in the tracking areas 1, 2, and 3.

TABLE 3

| PLMN ID | Location area | UE capability | ... PSI content |
|---|---|---|---|
| 1 | Tracking areas 1, 2, and 3 | Support an ANDSP | PSIs 1, 2, and 3 |
| 1 | Cell 101 | Support an ANDSP | PSIs 2 and 5 |
| 2 | ... | ... | |

For ease of querying content stored in the third communications apparatus, a data keyword (Data Key) may be used, or one or more data sub-keywords (Data sub keys) may be used, or both a data keyword and one or more data sub-keywords may be used to identify data, so that a data keyword or a data sub-keyword is used to query or confirm data identified by the data keyword or the data sub-keyword. Details are shown in Table 4.

TABLE 4

| Data set | Data subset | Data keyword | Data sub-keyword |
|---|---|---|---|
| Policy information | Policy set entry data | An SUPI in an HPLMN<br>A PLMN ID of the subscriber in the VPLMN | A location area in the VPLMN |

Figure 9:
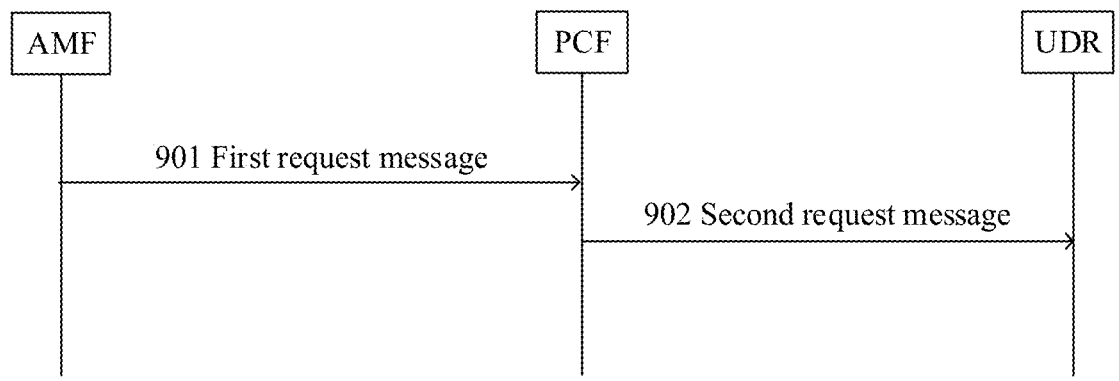
FIG. 9 is a schematic flowchart of still another example of a data management method.

As shown in FIG. 9, an AMF is a first communications apparatus, and a V-PCF is a second communications apparatus. In step 901, the AMF sends first request information to the V-PCF, where the request information includes at least SUPI information of UE. The first request information is used to instruct the second communications apparatus to obtain policy information of the UE stored in a third communications apparatus from the third communications apparatus. The first request information may be policy establishment request information, for example, may be Npcf_AMPolicyControl_Create information, or may be policy update request information, for example, Npcf_AMPolicyControl_update information.

In step 902, after receiving the request information, the V-PCF sends second request information to the third communications apparatus UDR, where the second request information may include at least one of a PLMN ID of a PLMN currently serving the UE, that is, a PLMN ID, location area information, and capability information. An HPLMN ID is a PLMN ID of the PLMN in home domain of the UE. The location area means current location information of the UE. The capability information indicates whether the UE requires an ANDSP. After receiving the second request information, as shown in Table 3 and Table 4, the V-UDR locates corresponding PSI content, to be specific, the policy information corresponding to the PSI, based on the HPLMN ID, the location area information, and the capability information that are included in the second request information, and sends, to the V-PCF, the corresponding policy information of the PSI. Optionally, the V-UDR may further send a PSI list to the V-PCF.

After receiving the policy information sent by the V-UDR, the V-PCF sends the policy information to the AMF.

During initial registration, the UE provides the PSI list that is used to identify the policy information currently stored in the UE. If the policy information is not stored in the UE, or a universal subscriber identity module (USIM) is changed, for example, the UE is replaced with a subscriber identity module (SIM) card, the UE is powered off abnormally, or a newly inserted SIM card is connected to a network for the first time, the UE does not provide any PSI. If the UE does not support non-3GPP access, the UE shall indicate that the UE does not support the ANDSP. In this case, the PCF should not send the ANDSP to the UE. During a Npcf_AMPolicyControl_Create procedure, the AMF provides the PCF with policy information related to UE access selection and a PDU session. For example, when the UE is powered on without changing the USIM, the UE may trigger initial registration by using the stored PSI list to request synchronization. An H-PCF receives a first PSI list provided by the AMF through the Npcf_AMPolicyControl_Create procedure. In a roaming scenario, the V-PCF obtains, in a manner shown in FIG. 8, a second PSI list and policy information content corresponding to the second PSI list that are stored in the V-UDR. The second PSI list and the policy information content corresponding to the second PSI list that are stored in the V-UDR are stored by using the PLMN ID of the subscriber and the location area of the UE as classification standards. For a storage form of the second PSI list and the corresponding policy information content, reference may be made to Table 3 and Table 4 and corresponding embodiments of Table 3 and Table 4 in this application.

The foregoing mainly describes the solutions provided in this embodiment of this application from a perspective of the method. To implement the foregoing functions, the apparatuses include hardware structures and/or software modules for performing corresponding functions. A person skilled in the art should be easily aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of this application.

In the embodiments of this application, function modules of the data management apparatus may be divided based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that the module division in the embodiments of this application is an example, and is merely logical function division. There may be another division manner in an actual implementation.

Figure 10:
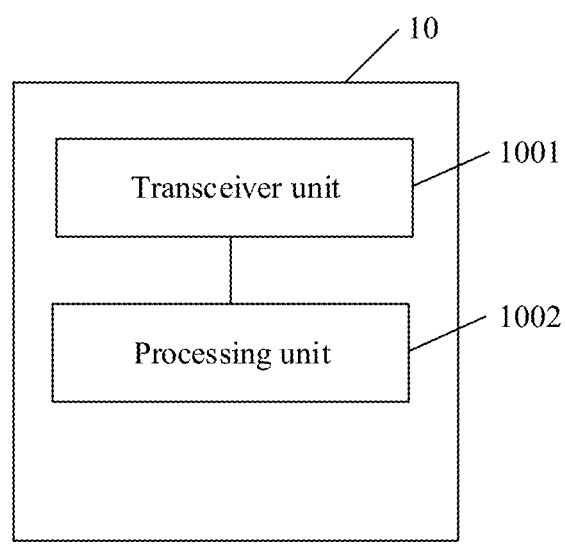
FIG. 10 is a schematic diagram of a data management apparatus according to an embodiment of this application.

FIG. 10 is a schematic structural diagram of a data management apparatus according to an embodiment of this application. The data management apparatus 10 shown in FIG. 10 may be configured to perform the embodiments provided above, or the steps performed by the first communications apparatus in the methods shown in FIG. 7 and FIG. 8, and may be further configured to perform the steps performed by the old AMF in any method provided above. When the first communications apparatus is an AMF, and when the AMF apparatus is an old AMF, the apparatus may perform steps performed by the old AMF. When the AMF apparatus is a new AMF apparatus, the data management apparatus may further perform steps performed by the new AMF apparatus, namely, a fourth communications apparatus. The data management apparatus 10 may include a transceiver unit 1001. A second communications apparatus sends first instruction information, where the first instruction information is used to instruct the second communications apparatus to trigger deletion of policy information of UE stored in a third communications apparatus. In addition, optionally, the transceiver unit 1001 is further configured to receive PLMN ID information or UDR group ID information sent by the fourth communications apparatus.

The data management apparatus may further include a processing unit 1002. The processing unit 1002 is configured to determine, based on at least the PLMN ID information of a PLMN currently serving the UE, to send the first instruction information to the second communications apparatus, and may be further configured to determine, based on at least the UDR group ID information of a UDR group currently serving the UE, to send the first instruction information to the second communications apparatus, and the processing unit may be further configured to, when the first communications apparatus deletes subscription information and an MM context of the UE, determine to send the first instruction information to the second communications apparatus.

When the fourth communications apparatus is the new AMF, the data management apparatus 10 may further have a function of performing the steps performed by the fourth communications apparatus in any method provided above. The transceiver unit 1001 is further configured to send the PLMN ID information or UDR group ID information to the old AMF.

The data management apparatus 10 shown in FIG. 10 may be configured to perform the embodiments provided above, or the steps performed by the first communications apparatus in FIG. 9 and related embodiments. The transceiver unit 1001 may be configured to send and receive information or a message, and when the data management apparatus includes the processing unit 1002, the processing unit 1002 may be configured to perform a related processing operation. For explanations of related content of the apparatus provided in this embodiment of this application and technical effects that can be obtained, reference may be made to the foregoing method embodiments. Details are not described herein again.

Figure 11:
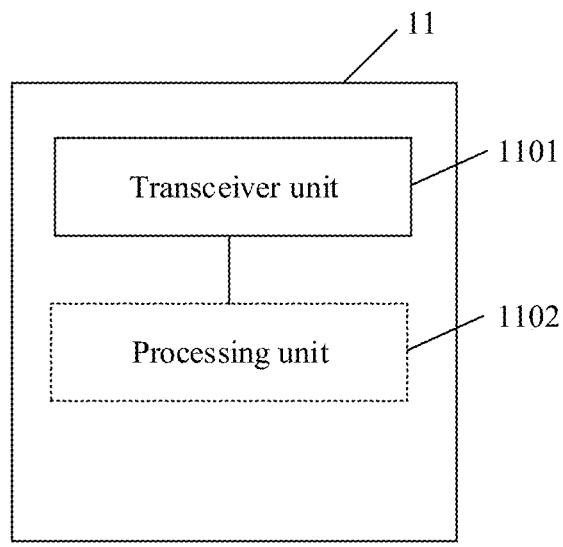
FIG. 11 is a schematic diagram of another data management apparatus according to an embodiment of this application.

FIG. 11 is a schematic structural diagram of a data management apparatus according to an embodiment of this application. The data management apparatus 10 shown in FIG. 11 may be configured to perform the embodiments provided above, or the steps performed by the second communications apparatus in the methods shown in FIG. 7 and FIG. 8. The data management apparatus 11 may be a PCF network element, and may be used as a V-PCF. The data management apparatus 9 may include a transceiver unit 1101, configured to receive first instruction information sent by a first communications apparatus, where the instruction information is used to instruct the second communications apparatus to trigger deletion of policy information of UE stored in a third communications apparatus. The transceiver unit 1101 is further configured to trigger deletion of the policy information of the UE stored in the third communications apparatus. The transceiver unit 1101 sends second instruction information to the third communications apparatus to trigger deletion of the policy information of the UE stored in the third communications apparatus. The second instruction information is used to instruct the third communications apparatus to delete the policy information of the UE.

The data management apparatus 11 shown in FIG. 11 may be configured to perform the embodiments provided above, or the steps performed by the second communications apparatus in FIG. 9 and related embodiments. The transceiver unit 1101 may be configured to send and receive information or a message, and when the data management apparatus includes the processing unit 1102, the processing unit 1102 may be configured to perform a related processing operation. For explanations of related content of the apparatus provided in this embodiment of this application and technical effects that can be obtained, reference may be made to the foregoing method embodiments. Details are not described herein again.

Figure 12:
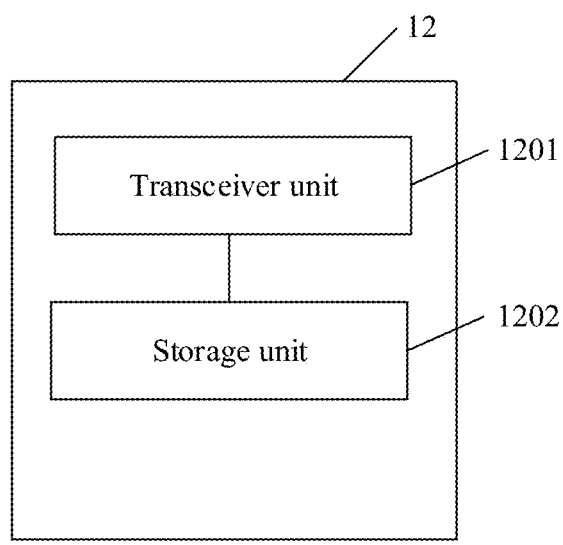
FIG. 12 is a schematic diagram of still another data management apparatus according to an embodiment of this application.

FIG. 12 is a schematic structural diagram of a data management apparatus according to an embodiment of this application. The data management apparatus 10 shown in FIG. 12 may be configured to perform the embodiments provided above, or the steps performed by the third communications apparatus in the methods shown in FIG. 7 and FIG. 8.

The data management apparatus 12 shown in FIG. 12 may be configured to perform the embodiments provided above, or the steps performed by the third communications apparatus in FIG. 9 and related embodiments. A transceiver unit 1201 may be configured to send and receive information or a message, and a storage unit 1202 may be configured to store related information. For explanations of related content of the apparatus provided in this embodiment of this application and technical effects that can be obtained, reference may be made to the foregoing method embodiments. Details are not described herein again.

Figure 13:
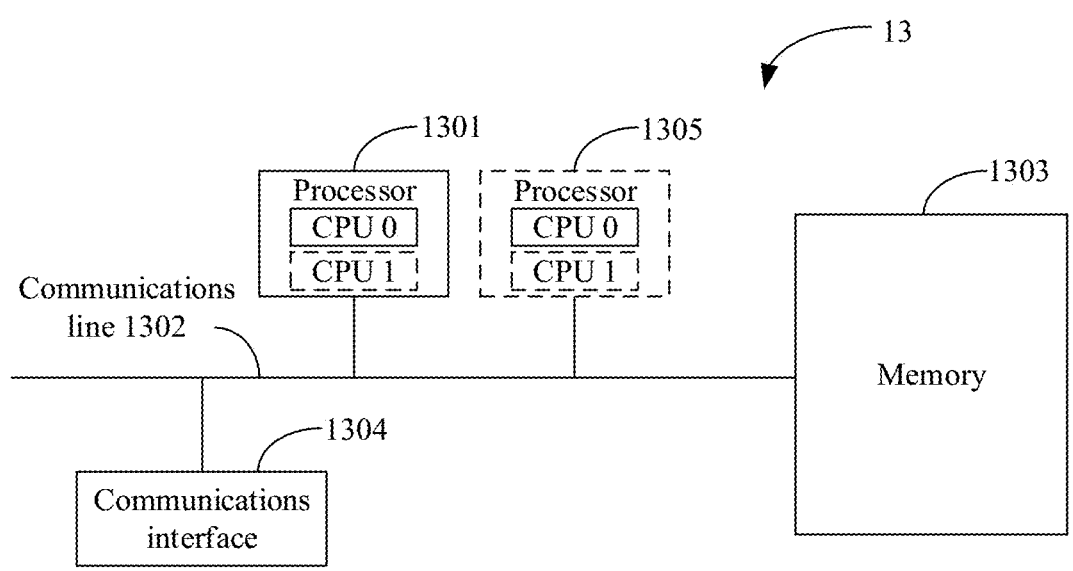
FIG. 13 is a schematic structural diagram of hardware of a data management apparatus according to an embodiment of this application.

FIG. 13 is a schematic structural diagram of a communications device to which a technical solution provided in an embodiment of this application is applicable. The communications device 11 may include at least one processor 1301, a communications line 1302, a memory 1303, and at least one communications interface 1304. The communications device 13 may be specifically any one of the data management apparatus 10, the data management apparatus 11, or the data management apparatus 12 provided above. For example, with reference to any one of FIG. 7 to FIG. 9, the transceiver unit may be the communications interface 1304 in FIG. 13, and the processing unit may be corresponding to the processor 1301 or the processor 1305 in FIG. 13.

The processor 1301 may be a general-purpose central processing unit (CPU), a microprocessor, an application-specific integrated circuit (ASIC), or one or more integrated circuits for controlling program execution of the solutions of this application.

The communications line 1302 may include a path through which information is transmitted between the foregoing components.

The memory 1303 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM), or another compact disc storage, an optical disc storage (including a compact disc, a laser disc, an optical disc, a digital versatile disc, a BLU-RAY disc, or the like), a disk storage medium or another disk storage device, or any other medium that can be used to carry or store expected program code that has an instruction or digital structure form and that can be accessed by a computer. This is not limited thereto.

The communications interface 1304 is any apparatus such as a transceiver, and configured to communicate with another device or communications network such as the Ethernet, a RAN, or a wireless local area network (WLAN).

The memory 1303 is configured to store a computer execution instruction for performing the solutions in this application, and the computer execution instruction is executed under control of the processor 1301. The processor 1301 is configured to execute the computer execution instruction stored in the memory 1303, to implement the method provided in the following embodiments of this application.

Optionally, the computer executable instruction in this embodiment of this application may also be referred to as application program code. This is not specifically limited in this embodiment of this application.

Optionally, the memory 1303 may exist independently, and is connected to the processor 1301 by using the communications line 1302. The memory 1303 may alternatively be integrated into the processor 1301.

During specific implementation, in an embodiment, the processor 1301 may include one or more CPUs, for example, a CPU 0 and a CPU 1 in FIG. 13.

During specific implementation, in an embodiment, the communications device 13 may include a plurality of processors such as the processor 1301 and the processor 1305 in FIG. 13. Each of these processors may be a single-core (single-CPU) processor, or may be a multi-core (multi-CPU) processor. The processor herein may be one or more devices, circuits, and/or processing cores used for processing data (such as a computer program instruction).

For related steps performed by the processor in the communications device provided in this embodiment of this application, explanations, and technical effects that can be obtained, reference may be made to the foregoing method embodiments. Details are not described herein again.

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases only A exists, both A and B exist, and only B exists.

In description of this application, the term "a plurality of" means two or more than two unless otherwise specified.

In addition, to clearly describe the technical solutions in the embodiments of this application, terms such as "first" and "second" are used in the embodiments of this application to distinguish between same items or similar items that have basically same functions or purposes. A person skilled in the art may understand that the terms, such as "first" and "second", are not intended to limit a quantity or an execution sequence, and the terms, such as "first" and "second", do not indicate a definite difference.

In addition, in the description of this application, unless otherwise specified, "at least one" means any one or any combination of more than one, and "at least one" means any one or any combination of more than one. For example, at least one of A, B, and C may include the following cases 1. A, 2. B, 3. C, 4. A and B, 5. A and C, 6. B and C, 7. A, B, and C.

The network architecture and the application scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new application scenarios, the technical solutions provided in the embodiments of this application are also applicable to similar technical problems.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc), a semiconductor medium (for example, a solid-state drive (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, the word "comprise" does not exclude another component or step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and accompanying drawings are merely examples of descriptions of this application defined by the appended claims, and is considered as any of or all modifications, variations, combinations or equivalents that cover the scope of this application. Apparently, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A data management method, comprising:
   receiving, by a unified data repository apparatus in a visited public land mobile network (VPLMN) from a policy control function apparatus in the VPLMN, first request information comprising a home public land mobile network (HPLMN) identity (ID) of a HPLMN of a user equipment (UE); and
   sending, by the unified data repository apparatus in the VPLMN, UE policy information corresponding to at least one data keyword, the at least one data keyword comprising the HPLMN ID, wherein the UE policy information for the HPLMN ID is stored in the unified data repository apparatus in the VPLMN and comprises a policy section identifier (PSI) list and a policy information content for each PSI in the PSI list.

2. The data management method of claim 1, further comprising:
   storing, by the unified data repository apparatus in the VPLMN, the UE policy information for the H-PLMN ID according to location area information.

3. The data management method of claim 1, further comprising locating, by the unified data repository apparatus in the VPLMN, the UE policy information using the at least one data keyword.

4. The data management method of claim 1, the method further comprising:
   retrieving, by the policy control function apparatus in the VPLMN from the unified data repository apparatus in the VPLMN, the UE policy information corresponding to the HPLMN ID.

5. A communications apparatus for data management, comprising:
   a memory comprising instructions; and
   one or more processors in communication with the memory, wherein the one or more processors execute the instructions to:
   receive first request information from a policy control function apparatus in a visited public land mobile network (VPLMN), the first request information comprising a home public land mobile network (HPLMN) identity (ID) of a HPLMN of a user equipment (UE); and
   send, to the policy control function apparatus in the VPLMN, UE policy information corresponding to the HPLMN ID, wherein the UE policy information for the HPLMN ID is stored in the communication apparatus and comprises a policy section identifier (PSI) list and a policy information content for each PSI in the PSI list, wherein the communication apparatus is a unified data repository in the VPLMN.

6. The communications apparatus of claim 5, wherein the UE policy information is stored in the unified data repository in the VPLMN according to a location area.

7. A communications apparatus for data management, comprising:
   a memory comprising instructions; and
   one or more processors in communication with the memory, wherein the one or more processors execute the instructions to:
   send first request information to a unified data repository apparatus in a visited public land mobile network (VPLMN), the first request information comprising a home public land mobile network (HPLMN) identity (ID) of a HPLMN of a user equipment (UE); and
   receive UE policy information corresponding to the HPLMN ID from the unified data repository apparatus in the VPLMN, wherein the UE policy information for the HPLMN ID is stored in the unified data repository apparatus in the VPLMN and comprises a policy section identifier (PSI) list and a policy information content for each PSI in the PSI list, wherein the communication apparatus is a policy control function apparatus in the VPLMN.

8. The communications apparatus of claim 7, wherein the UE policy information corresponds to a location area.

9. The communications apparatus of claim 7, wherein the one or more processors further execute the instructions to:
receive, from an access and mobility management function apparatus in the VPLMN, second request information that comprises subscription permanent identifier of the UE; and
send the UE policy information to the access and mobility management function apparatus in the VPLMN.

10. A system, comprising:
policy control function apparatus in a visited public land mobile network (VPLMN) comprising a first memory and a first processor in communication with the first memory;
a unified data repository apparatus in the VPLMN comprising a second memory and a second processor in communication with the second memory;
where the policy control function apparatus in the VPLMN is configured to send first request information to the unified data repository apparatus in the VPLMN, the first request information comprising a home public land mobile network (HPLMN) identity (ID) of a HPLMN of a user equipment (UE); and
wherein the unified data repository apparatus in the VPLMN is configured to send UE policy information in response to the first request information with the HPLMN ID, the UE policy information corresponding to the HPLMN ID, wherein the UE policy information for the HPLMN ID is stored in the unified data repository apparatus in the VPLMN and comprises a policy section identifier (PSI) list and a policy information content for each PSI in the PSI list.

11. The system of claim 10, wherein the UE policy information of the UE is stored in the unified data repository apparatus in the VPLMN according to a location area.

12. The system of claim 10, wherein the policy control function apparatus in the VPLMN is further configured to:
receive, from an access and mobility management function apparatus in the VPLMN, second request information that comprises a subscription permanent identifier of the UE; and
send the UE policy information to the access and mobility management function apparatus in the VPLMN.

13. The system of claim 12, the system further comprising the access and mobility management function apparatus in the VPLMN, wherein the access and mobility management function apparatus comprises a third memory and a third processor in communication with the third memory and is configured to:
send the second request information that comprises the subscription permanent identifier of the UE to the policy control function apparatus in the VPLMN; and
receive the UE policy information from the policy control function apparatus in the VPLMN.

14. A data management method, comprising:
sending, by a policy control function apparatus in a visited public land mobile network (VPLMN) to a unified data repository apparatus in the VPLMN, first request information comprising a home public land mobile network (HPLMN) identity (ID) of a HPLMN of a user equipment (UE);
receiving, by the unified data repository apparatus in the VPLMN from the policy control function apparatus in the VPLMN, the first request information; and
sending, by the unified data repository apparatus in the VPLMN, UE policy information corresponding to at least one data keyword, the at least one data keyword comprising the HPLMN ID, wherein the UE policy information for the HPLMN ID is stored in the unified data repository apparatus in the VPLMN and comprises a policy section identifier (PSI) list and a policy information content for each PSI in the PSI list.

15. The data management method of claim 14, further comprising:
identifying, by the unified data repository apparatus in the VPLMN, the UE policy information based on the PSI; and
storing, by the unified data repository apparatus in the VPLMN, the HPLMN ID and location area information corresponding to the HPLMN ID.

16. The data management method of claim 14, wherein the UE policy information of the UE is stored in the unified data repository apparatus in the VPLMN according to a location area.

17. The data management method of claim 14, further comprising:
receive, by the policy control function apparatus in the VPLMN from an access and mobility management function apparatus in the VPLMN, second request information that comprises a subscription permanent identifier of the UE; and
send, by the policy control function apparatus in the VPLMN, the UE policy information to the access and mobility management function apparatus in the VPLMN.

18. A data management method, comprising:
sending, by a policy control function apparatus in a visited public land mobile network (VPLMN), first request information to a unified data repository apparatus in the VPLMN, wherein the first request information comprising a home public land mobile network (HPLMN) identity (ID) of a HPLMN of a user equipment (UE); and
receiving, by the policy control function apparatus in the VPLMN, UE policy information corresponding to the HPLMN ID from the unified data repository apparatus in the VPLMN, wherein the UE policy information for the HPLMN ID is stored in the unified data repository apparatus in the VPLMN and comprises a policy section identifier (PSI) list and a policy information content for each PSI in the PSI list.

19. The data management method of claim 18, wherein the UE policy information corresponds to a location area.

20. The data management method of claim 18, further comprising:
receiving, by the policy control function apparatus in the VPLMN from an access and mobility management function apparatus in the VPLMN, second request information that comprises a subscription permanent identifier of the UE; and
sending the UE policy information to the access and mobility management function apparatus in the VPLMN.

* * * * *